J. M. DOWNING.

Lime Kiln.

6727X

Patented Aug. 25, 1831.

THE NORRIS PETERS CO., PHOTO-LITHO., WASHINGTON, D. C.

Joseph M. Downing of Bristol, Pa.
Letters Patent
Aug. 25, 1831

Dated August 25th 1831.

The Schedule referred to in these Letters Patent, and making part of the same,
containing a description in the words of the said Joseph M. Downing himself of his
improvement in the Kiln for the burning of Lime with Anthracite Coal.

---

Figure 1:
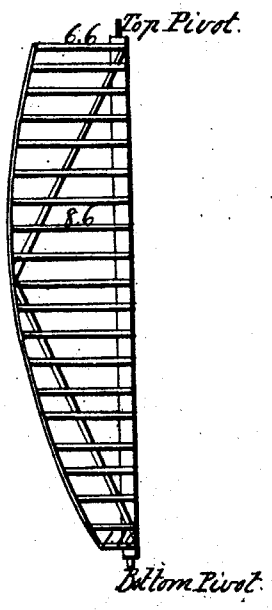
Figure 1:
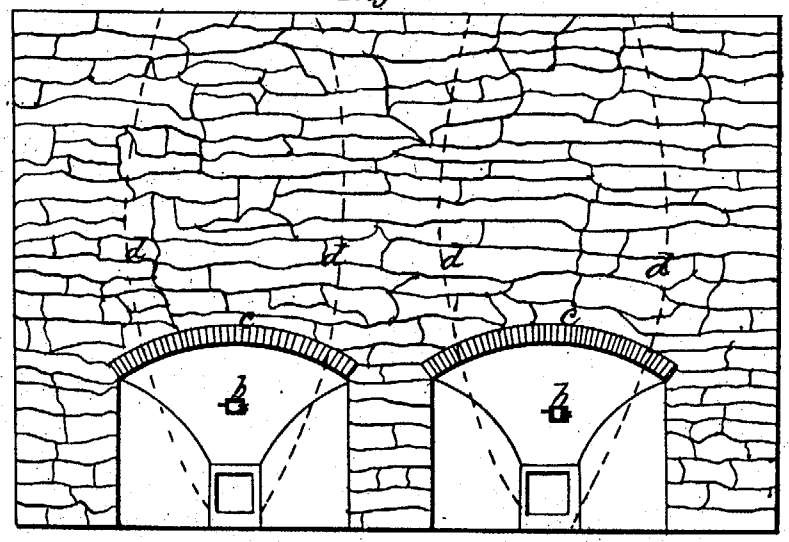
Figure 2:
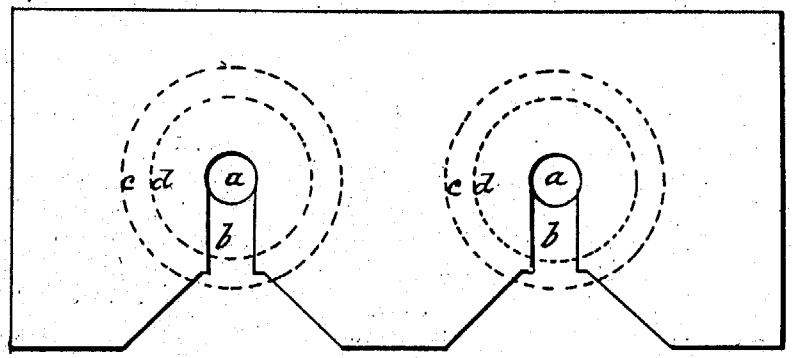

To all whom it may concern: Be it known, that I Joseph M. Downing, of Bristol,
in the County of Bucks, and State of Pennsylvania, have made certain improvements in
the construction of the Perpetual Kilns for the burning of Lime by means of Anthracite Coal,
by which Quick Lime is obtained free from core, and equal for all purposes to the best lime
burnt with wood; and I do hereby declare that the following is a full and exact description
of my mode of constructing and using the same. — Fig. 1, in the accompanying drawing, rep-
resents a front elevation of a double Kiln built on my principle, and is taken from one in actual
use; the main body of this kiln is built of stone and is laid in strong sand and lime mortar;
it is lined with brick, soap stone, or other material, which will stand fire, clay being used
as a cement instead of mortar. A, is the aperture from which the lime is drawn, B, a regu-
lating door or valve, for the draft of air, C, the arch to support the breast of the Kiln; and
the dotted lines d d show the general form of the interior, which is circular in its hori-
zontal section; its vertical section being somewhat in the form of an egg truncated at each
end and standing on the smaller one. Fig. 2, is the ground plan, the references to which
upon the drawing are sufficiently explanatory. The admeasurements are only relative, and
are from their nature susceptible of considerable variation. When building this kiln I employ
a guage or pattern such as is represented at Fig. 3, the use of which is quite obvious, although
great advantage is derived from its employment it may be dispensed with. In this Kiln,
the arch grates, or bars, in or across the bottom, or any other part, are dispensed with and the
form given to the inside is such as allows the lime to settle down and be drawn from the
aperture at the bottom without interrupting the progress of burning. In filling the kiln, in order
to insure an equal and regular distribution of heat, the stones are broken so that the largest
do not exceed six inches in diameter; the smaller ones are then placed round the outside,
and the larger ones in the middle of the kiln, the interstices carefully filled with small ones,
the whole intimately mixed with small coal in the proportion of about one part by measure
of coal to five parts of broken stone, the exact proportion must however depend on the quality

6137X of the stone and also of the coal.

What I claim as new is the described construction of the Kiln by which the arch, grates, or bars usually employed to sustain the lime and fuel, are dispensed with, and the general form and construction as above described with the mode of filling them for the purpose of producing the beneficial results herein before set forth.

Witnesses;
Isaiah Kelley,
Samuel Allen Jr.

Joseph M. Downing

[illegible]

[illegible]